United States Patent
Karstens

(10) Patent No.: US 8,245,154 B2
(45) Date of Patent: Aug. 14, 2012

(54) MOST-RECENTLY-USED TASK SWITCHING AMONG PARENT AND CHILD WINDOWS

(75) Inventor: Christopher K. Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 934 days.

(21) Appl. No.: 11/556,351

(22) Filed: Nov. 3, 2006

(65) Prior Publication Data

US 2008/0109753 A1    May 8, 2008

(51) Int. Cl.
    *G06F 3/048* (2006.01)
(52) U.S. Cl. ......... 715/802; 715/797; 715/783; 715/810
(58) Field of Classification Search .................. 715/783, 715/797, 802, 810
    See application file for complete search history.

(56) References Cited

U.S. PATENT DOCUMENTS

| | | | | |
|---|---|---|---|---|
| 5,438,661 | A * | 8/1995 | Ogawa | 715/804 |
| 5,621,880 | A * | 4/1997 | Johnson | 715/783 |
| 5,627,960 | A * | 5/1997 | Clifford et al. | 715/842 |
| 5,668,962 | A * | 9/1997 | Kitami | 715/783 |
| 5,835,088 | A * | 11/1998 | Jaaskelainen, Jr. | 715/803 |
| 5,892,511 | A * | 4/1999 | Gelsinger et al. | 715/794 |
| 6,025,842 | A * | 2/2000 | Filetto et al. | 715/803 |
| 6,239,798 | B1 * | 5/2001 | Ludolph et al. | 715/788 |
| 6,300,951 | B1 * | 10/2001 | Filetto et al. | 715/797 |
| 6,523,048 | B2 * | 2/2003 | DeStefano | 715/234 |
| 6,590,594 | B2 * | 7/2003 | Bates et al. | 715/784 |
| 6,781,611 | B1 * | 8/2004 | Richard | 715/779 |
| 8,028,247 | B2 | 9/2011 | Haynes | |
| 2003/0117440 | A1 * | 6/2003 | Hellyar et al. | 345/767 |
| 2004/0237049 | A1 | 11/2004 | Pletcher et al. | |
| 2004/0249801 | A1 | 12/2004 | Kapur | |
| 2004/0261037 | A1 * | 12/2004 | Ording et al. | 715/788 |
| 2005/0149879 | A1 * | 7/2005 | Jobs et al. | 715/796 |
| 2005/0198585 | A1 | 9/2005 | Haynes | |
| 2005/0219209 | A1 * | 10/2005 | Fleck et al. | 345/157 |
| 2005/0246325 | A1 * | 11/2005 | Pettinati et al. | 707/3 |
| 2006/0036995 | A1 | 2/2006 | Chickles et al. | |
| 2006/0161847 | A1 * | 7/2006 | Holecek et al. | 715/716 |
| 2006/0224992 | A1 * | 10/2006 | Rossi et al. | 715/781 |
| 2006/0248471 | A1 * | 11/2006 | Lindsay et al. | 715/800 |
| 2006/0271878 | A1 * | 11/2006 | Hashimoto | 715/781 |
| 2007/0092243 | A1 * | 4/2007 | Allen et al. | 396/121 |

* cited by examiner

*Primary Examiner* — Tuyetlien Tran
(74) *Attorney, Agent, or Firm* — Marcia L. Doubet

(57) ABSTRACT

Task switching among windows on a graphical user interface. Responsive to user action (such as simultaneously pressing the ALT and TAB keys), a task selection window is displayed in which an iconic representation is provided for a plurality of windows, including at least one child window, and the iconic representations are arranged according to how recently the associated window had focus. Responsive to user action (such as pressing the TAB key while the ALT key remains depressed), a selection indicator moves through the selectable iconic representations in the order of the recency of the focus.

20 Claims, 12 Drawing Sheets

MOST-RECENTLY-USED TASK SWITCHING AMONG PARENT AND CHILD WINDOWS

BACKGROUND OF THE INVENTION

The present invention relates generally to computing systems, and more particularly to computing systems that use a windowing operating system for displaying information on a graphical user interface ("GUI").

When using a windowing operating system (such as that provided by the Microsoft Windows® operating system), users often desire to switch among various ones of the displayed windows. ("Windows" is a registered trademark of Microsoft Corporation in the United States, other countries, or both.) In one approach, the user may switch to a particular window by pressing the left mouse button when a representation of the mouse cursor (such as a pointing arrow) is positioned over some portion of that window. In another approach, the user may press a key combination, such as ALT plus TAB in the Windows operating system, to cycle among the active windows (i.e., the windows of the currently-executing applications; hereinafter, the term "active window" refers to a window from a currently-executing application). In the Windows operating system, pressing this key combination causes the operating system to display a small window with an iconic representation displayed therein for each of the active windows. Graphical highlighting within this window indicates which window is currently targeted to have the focus. Once this small window is displayed, the user can cycle among the currently-active windows by continuing to press the TAB key while the ALT key remains depressed. The graphical highlighting changes, responsive to the TAB key, and when the user has reached the active window of interest, releasing the ALT and TAB keys causes that window to receive the focus and to therefore move to the foreground of the GUI display (and the small window also disappears).

See FIG. 1, where a sample version of a small window 150 is depicted on a GUI 100. This sample window 150 is representative of a window that may be displayed, in the prior art, responsive to pressing ALT-TAB (that is, a combination of the ALT and TAB keys). In this sample window 150, iconic representations 151, 152, 153 are displayed therein for three currently-active windows 110, 120, 130, and graphical highlighting (shown, for ease of illustration, as a dashed rectangular box) at 152 indicates that window "B" 120 is currently targeted to have the focus (and window 120 is shown, in this example, in the foreground of window 100, where it overlaps windows 110 and 130). Rectangular text box 154 indicates, in this example, a name "Window B" that is associated with the window which is graphically highlighted. If the user presses the TAB key again while the ALT key remains depressed, the graphical highlighting will move to 153 (indicating that window "C" 130 will receive the focus, and will therefore move to the foreground of the GUI display 100, if the keys are released); if the TAB key is pressed another time while the ALT key remains depressed, the graphical highlighting will move to 151 (indicating that window "A" 110 will receive the focus, and will therefore move to the foreground of the GUI display 100, if the keys are released).

BRIEF SUMMARY OF THE INVENTION

Preferred embodiments of the present invention provide task switching among windows on a GUI of a computing device. In one aspect of preferred embodiments, the present invention comprises: determining, for each of a plurality of windows on the GUI corresponding to at least one currently-executing application, how recently each of the windows had focus, wherein at least one of the windows is a child window of a parent window; displaying, responsive to an indication from a user of the computing device, a task selection window comprising a plurality of selectable iconic representations, each of the selectable iconic representations associated with a different one of at least two of the windows, the selectable iconic representations being arranged in the task selection window in an order according to the determined recency of the focus of the associated one of the windows; and moving a selection indicator, responsive to an action of the user, through the selectable iconic representations in the order of the determined recency of the focus. Preferably, the order is from most-recently-used to least-recently-used, with regard to the determined recency of the focus.

In another aspect of preferred embodiments, the present invention comprises: a determining, for each of a plurality of windows on the GUI corresponding to at least one currently-executing application, how recently each of the windows had focus, wherein at least one of the windows is a child window of a parent window; displaying, responsive to an indication from a user of the computing device, a task selection window comprising a plurality of selectable iconic representations, each of the selectable iconic representations associated with a different one of at least two of the windows, the selectable iconic representations being arranged in the task selection window in an order according to the determined recency of the focus of the associated one of the windows, wherein the order is from most-recently-used to least-recently-used, with regard to the determined recency of the focus; and a moving a selection indicator, responsive to an action of the user, through the selectable iconic representations in the order of the determined recency of the focus.

In a further aspect of preferred embodiments, the present invention comprises: determining, for each of a plurality of windows on the GUI corresponding to at least one currently-executing application, how recently each of the windows had focus, wherein at least one of the windows is a child window of a parent window; displaying, responsive to an indication from a user of the computing device, a task selection window comprising a plurality of selectable iconic representations, each of the selectable iconic representations associated with a different one of at least two of the windows, the selectable iconic representations being arranged in the task selection window in an order according to the determined recency of the focus of the associated one of the windows; moving a selection indicator, responsive to an action of the user, through the selectable iconic representations in the order of the determined recency of the focus; and responsive to a signal from the user after moving the selection indicator to a selected one of the iconic representations, removing the task selection window from the GUI and bringing a selected one of the windows to foreground of the GUI and giving the focus to the selected one in the foreground, the selected one of the windows comprising that one of the windows which is associated with the selected one of the iconic representations.

These aspects may be provided as computer-implemented methods, systems, and/or computer program products.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

DETAILED DESCRIPTION OF THE INVENTION

Preferred embodiments of the present invention are directed toward a most-recently-used approach to task switching among parent and child windows on a GUI provided by a windowing operating system. While a key combination such as ALT-TAB enables a user to switch, or cycle, between windows in a prior art windowing operating system, such techniques are limited to "main" windows (also referred to herein as "parent" windows) corresponding to currently-executing applications. Such techniques do not, for example, enable using the ALT-TAB key combination for switching between, or to, sub-windows (also referred to herein as "child windows") within one or more parent windows. As one example, these known techniques do not enable cycling between sub-windows of a tabbed window, such as the sample window 200 depicted in FIG. 2 where the sub-windows are associated with tabs 210-240.

Many applications present their GUI(s) using sub-windows. The Lotus® Notes® application, for example, uses a tabbed window approach for presenting sub-windows. ("Lotus" and "Notes" are registered trademarks of International Business Machines Corporation in the United States, other countries, or both.) To switch between sub-windows using prior art techniques, users typically use the mouse (or similar pointing device) to point and click on the desired sub-window (or a tab thereof, when using a tabbed window); or, an application may provide an application-specific (and often awkward or unusual) key combination to give focus to a different sub-window. In the latter case, these application-specific key combinations can be difficult for users to use and/or to remember.

Figure 1:
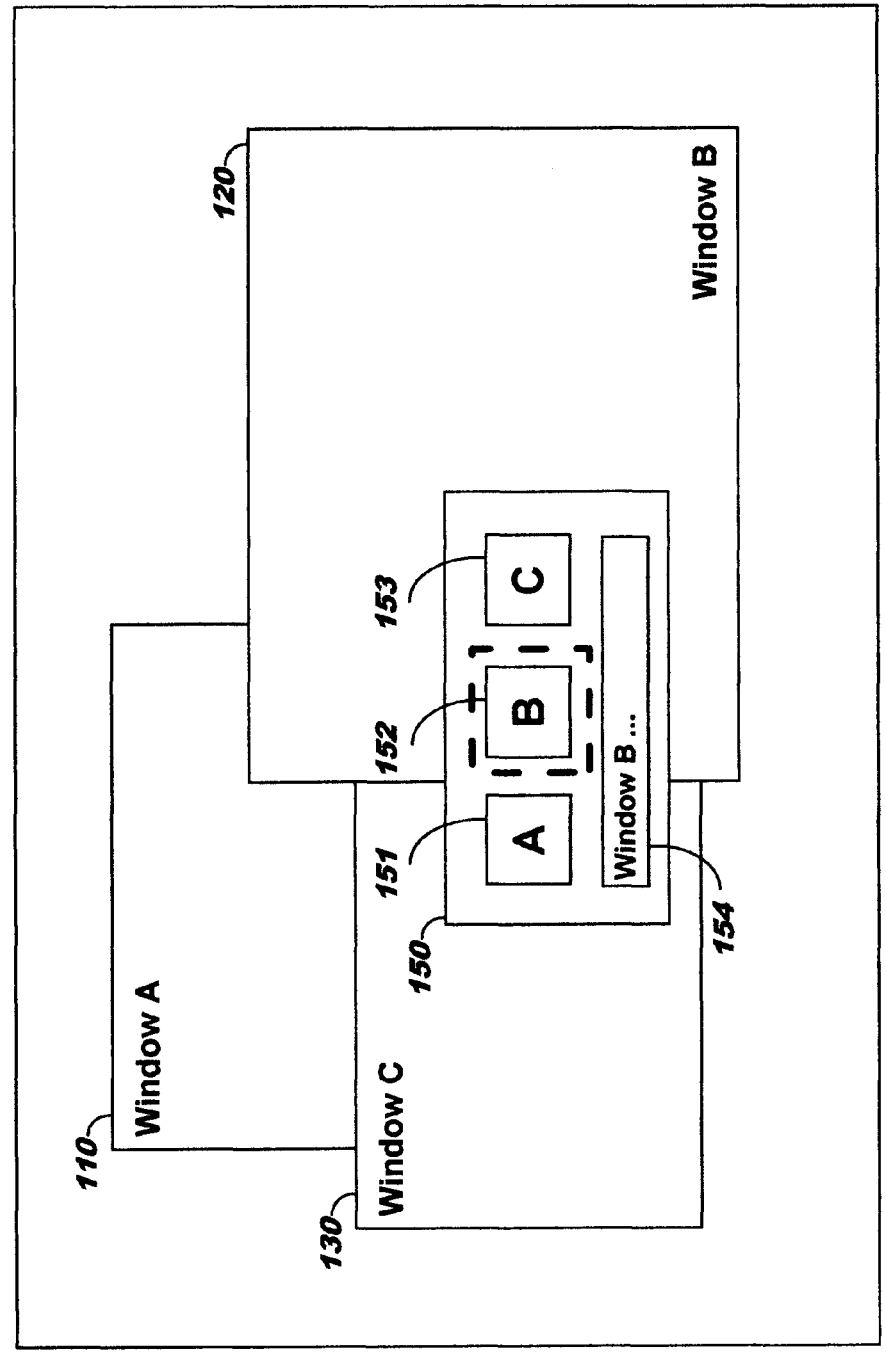
FIG. 1 depicts a GUI with a small window containing iconic representations of currently-active windows, according to the prior art.
Figure 2:
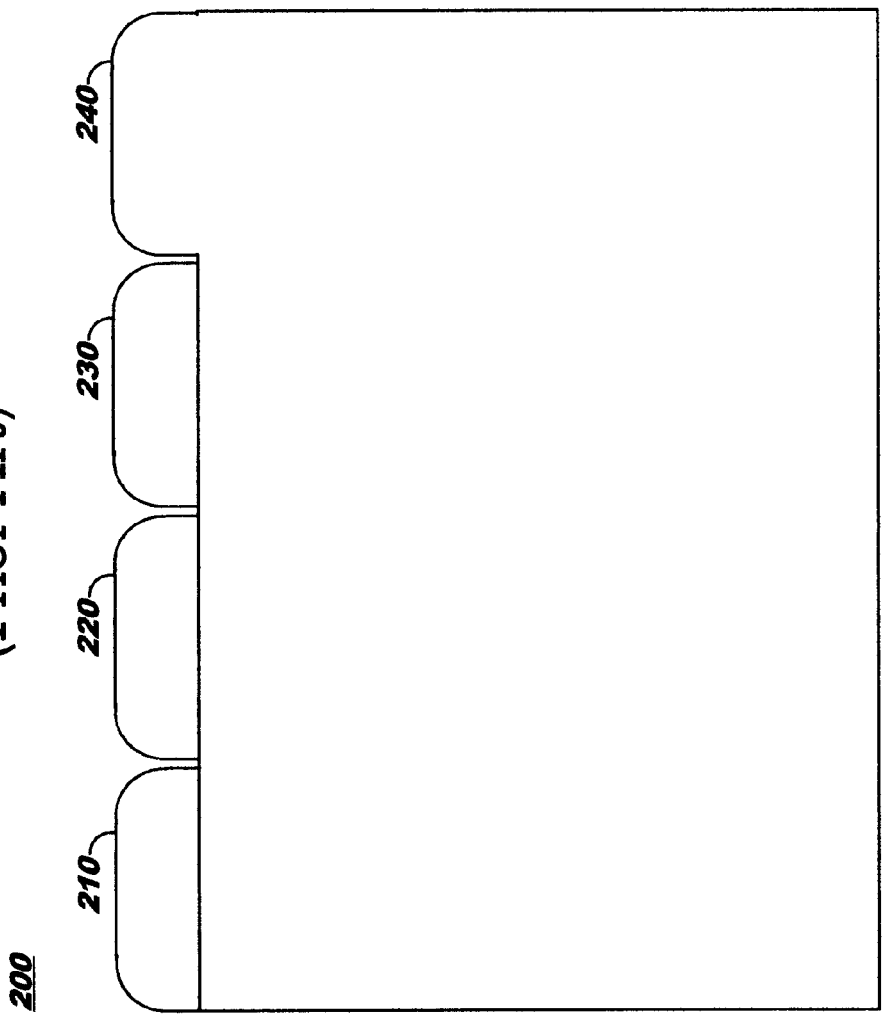
FIG. 2 illustrates sub-windows of a tabbed window, according to the prior art.

For the Lotus Notes application, for example, pressing a combination of the ALT key and the W key, then releasing those keys and pressing a numeric key, will cause focus to be given to the sub-window for which the window's ordinal number corresponds to the pressed numeric key. Suppose, for example, that the tabbed window 200 of FIG. 2 is generated by the user's Lotus Notes application, and that 4 sub-windows are currently active within this application. FIG. 2 therefore illustrates 4 tabs 210-240 on the tabbed window 200. If the user presses the "2" key after releasing the ALT-W key combination when using the Lotus Notes application, then the sub-window associated with tab 220 will be brought to the foreground of window 200.

According to preferred embodiments of the present invention, support is provided for switching among/between windows within an application. Child windows of executing applications are added to the task list, and with this task list, the user may switch from one child window to another child window within a particular application, and/or may switch from a window generated by one parent application to a child window of a different application. It may happen that a user has many windows and/or sub-windows active at a point in time, but has recently been working with only a relatively small subset of those windows and/or sub-windows. Accordingly, it is likely that the windows in this subset are the ones of most interest to this user. In preferred embodiments, a most-recently-used ("MRU") strategy is therefore used for ordering the choices on the task list, and the ALT-TAB key combination is adapted for switching among the entries on this task list. The user is thereby given more granular control over selecting which particular window or sub-window will receive the focus at a point in time, and the choices can optionally be restricted (as will be described) to a subset of the windows and sub-windows that are currently active. (Other key combinations may be used for the MRU task list switching disclosed herein, instead of ALT-TAB, without deviating from the scope of the present invention.)

Figure 3:
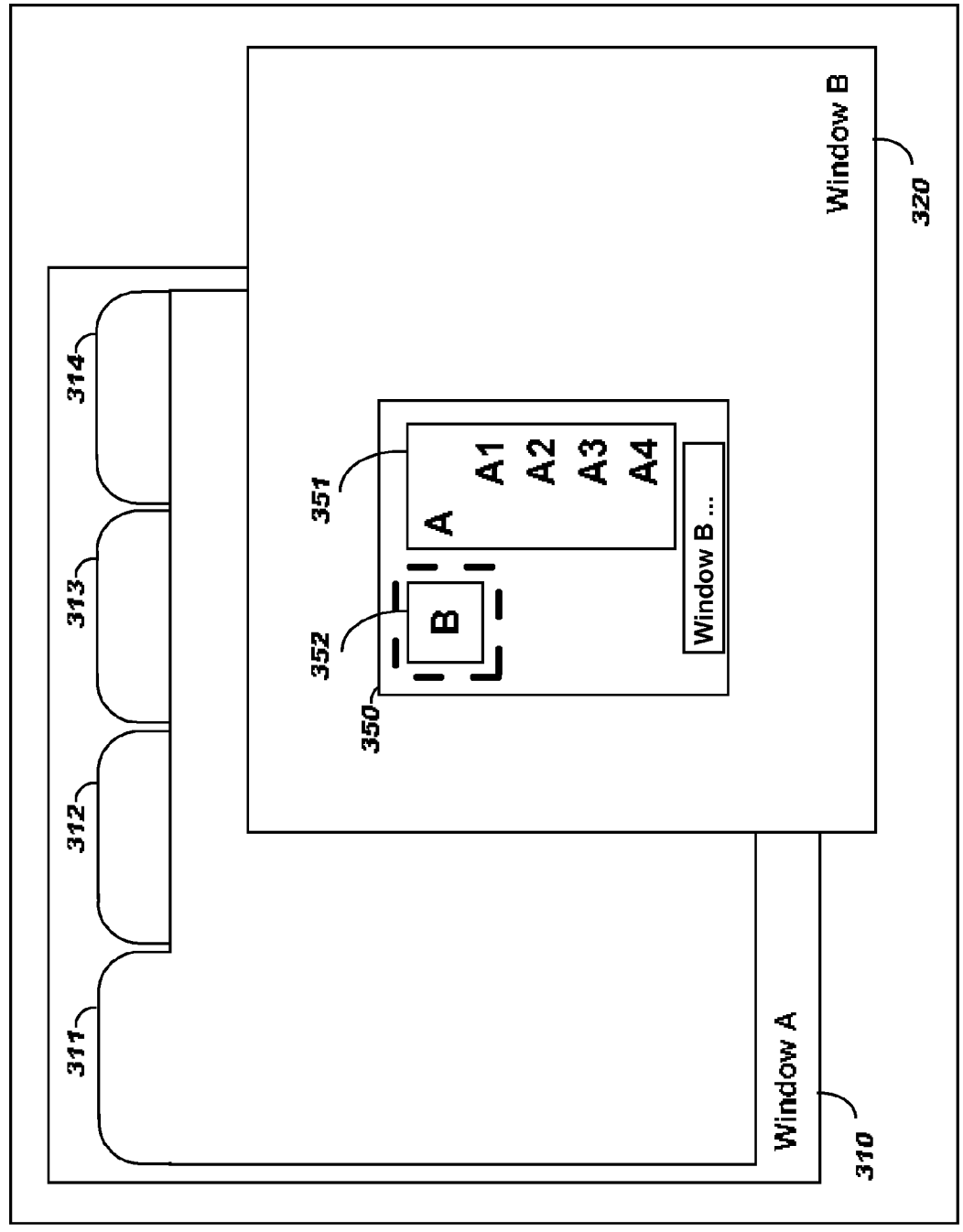
FIG. 3 illustrates a sample version of a small window that may be used for task list switching, according to preferred embodiments.

FIG. 3 illustrates a sample version of a small window 350 that may be used for the MRU task list switching of preferred embodiments. In this example, a first application "A" has a window 310 in which a tabbed page with 4 tabs 311-314 is displayed; of these tabs, tab 311 is the most-recently-used, as can be seen from the fact that the sub-window for tab 311 is overlapping the sub-windows associated with the other 3 tabs. A second application "B" has a window 320, which has the current focus, as can be seen by the fact that window 320 is overlapping window 310.

For this example, window 350 provides an iconic representation for each of the parent windows "A" and "B", as well as for the 4 sub-windows of window A. In the example, these sub-windows are referred to as "A1", "A2", "A3", and "A4" in the iconic representations, and those iconic representations are illustrated as being indented under the representation of their parent window. See reference number 351. (Other approaches for displaying iconic representations of child windows may be used without deviating from the scope of the present invention.) In preferred embodiments, the order of traversing through an MRU task list is to traverse down a particular vertical list of child windows (where the child windows are presented therein according to their MRU order) before traversing horizontally to the next parent window or child list thereof. In the example of FIG. 3, the MRU ordering of the child windows indicates that child window 311 had focus more recently than child window 312, which in turn had focus more recently than child window 313, and child window 313 had focus more recently than child window 314. Graphical highlighting at 352 indicates that parent window 320 is currently selected in the MRU task list. If the user then presses the TAB key, then in one approach, the graphical highlighting will move to the iconic representation of window A, after which subsequent pressing of the tab key will move the graphical highlighting downward through the MRU list of the sub-windows A1-A4 of window A; in another approach, the graphical highlighting bypasses the iconic representation of any parent for which iconic representations of child windows are present in the MRU task list. If the user releases the ALT and TAB keys while the graphical highlighting is positioned at the iconic representation of one of the sub-windows, then the tabbed sub-window corresponding to that iconic representation will receive the focus (and window 350 will preferably disappear). In this manner, the user is able to cycle among not only parent windows, but also among child windows, using the task list.

In one optional aspect, a time limit is imposed on the switching. Time limits may be relative or absolute. In another optional aspect, a window-count limit is imposed. These and similar limits may be applied on an application-wide basis. As an alternative, the limits may be applied on an operating system-wide basis. In preferred embodiments, the limits apply to sub-windows, but do not apply to main (i.e., parent) windows. (It should be noted that prior art switching among parent windows does not use an MRU approach and does not use limits as disclosed herein.) One or more of these options may be supported in a particular implementation of the present invention.

As an example of applying a time limit on an application-wide basis, an application may have an associated time limit (which may be configurable on a per-application basis), and child windows which have not had focus within this time limit will then not be represented in the MRU task list. In other words, those child windows are "aged out" of the MRU task list. As an example of using a relative time limit, the time limit might be set to age out child windows that have not had focus within the past 5 minutes. As an example of using an absolute time limit, the time limit might be set to age out child windows that had not had focus since some particular time of day.

By contrast, when a time limit is applied on an operating system-wide basis, then the aging out from the MRU task list applies to all child windows of all currently-executing applications. As with application-wide time limits, time limits that apply on an operating system-wide basis may be relative or absolute.

As an example of applying a window-count limit on an application-wide basis, an application may have an associated numeric window count limit (which may be configurable on a per-application basis), and the entries in the task list for this application are then limited to that number of most-recently-used child windows. Any child windows beyond that number will not be represented in (i.e., will be aged out of) the MRU task list. So, for example, if a particular application has a window-count limit of 4 and 7 child windows are active for this application, then only the 4 most-recently-used ones of those child windows will be represented in the MRU task list. According to preferred embodiments, the window-count limit may vary among applications.

By contrast, when a window-count limit is applied on an operating system-wide basis, then the operating system has an associated numeric window count limit (which may be configurable), and the entries in the task list are limited to that number of most-recently-used child windows from each of the currently-executing applications. This approach avoids the need to set a per-application window-count limit. Suppose, for example, that the operating system-wide window-count limit is set to 3, and that 2 applications are presently executing. If one of these application has 4 sub-windows and the other application has 5 sub-windows, only the 3 most-recently-used sub-windows from each application (for a total of 6 sub-windows, in this example) will be represented in the MRU task list.

Several additional example scenarios will now be described, with reference to FIGS. 4-9, to illustrate use of various aspects of preferred embodiments.

Figure 4:
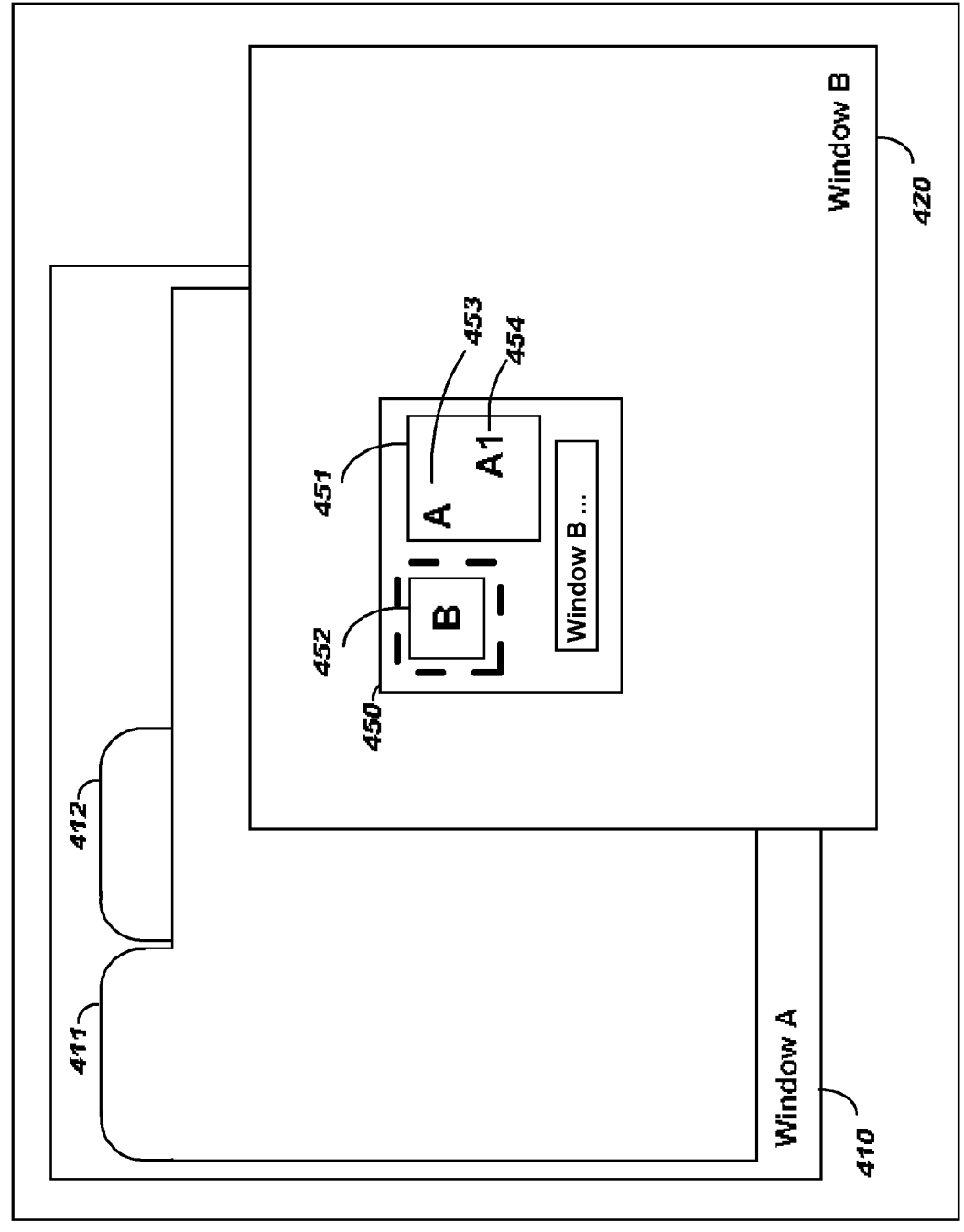
FIGS. 4-9 depict example scenarios, and are used to describe operation of various aspects of embodiments of the present invention.
Figure 5:
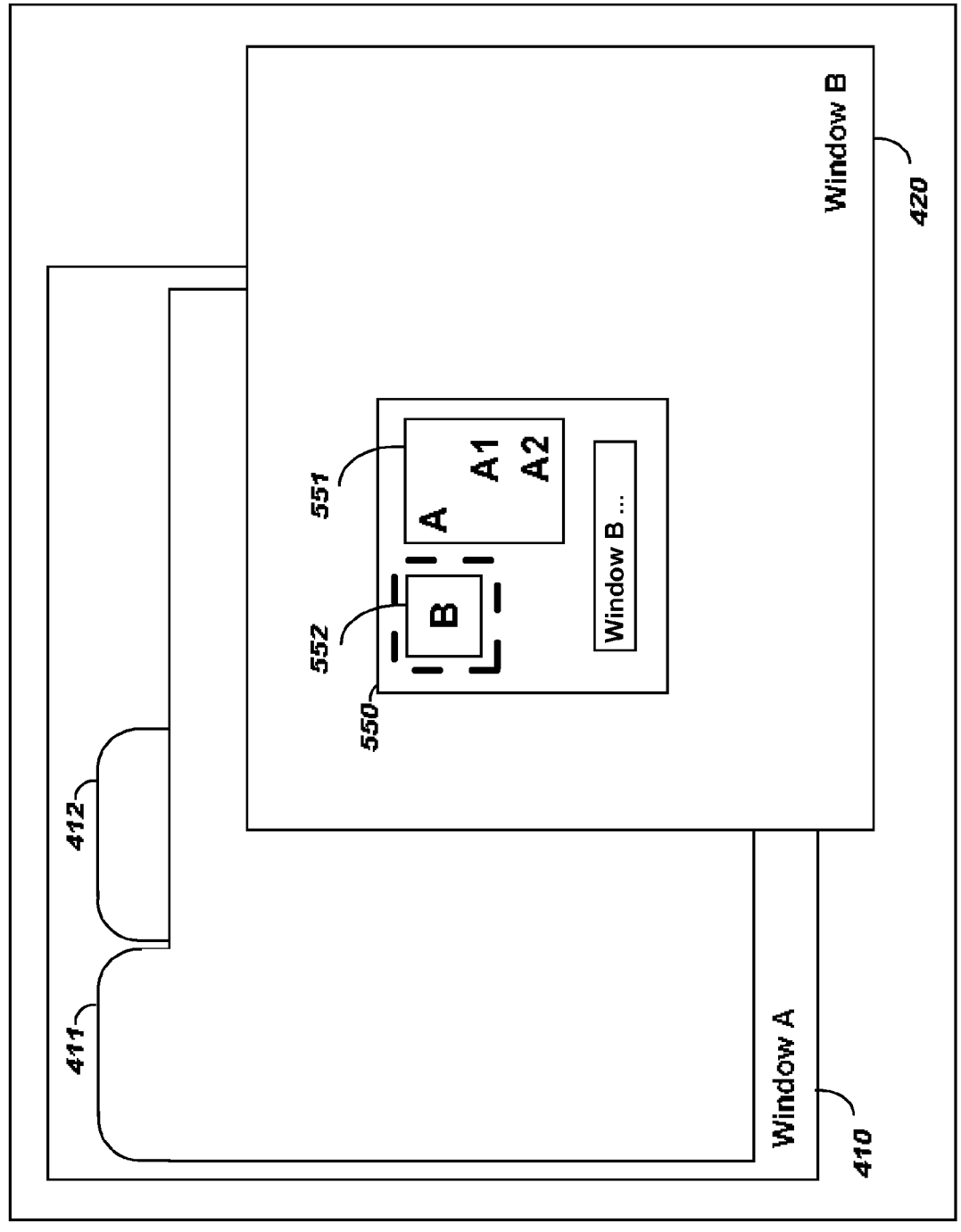
Figure 6:
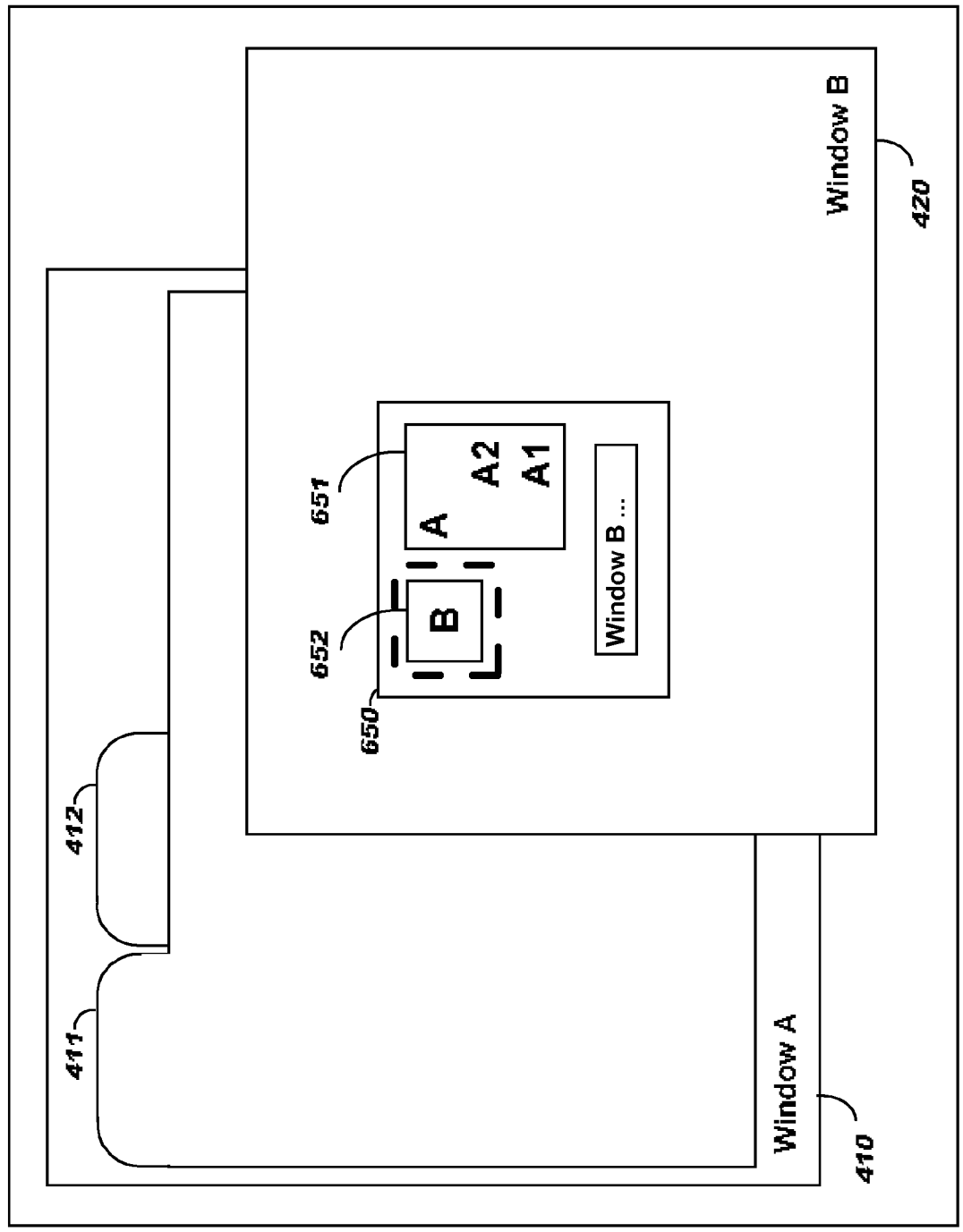
Figure 7:
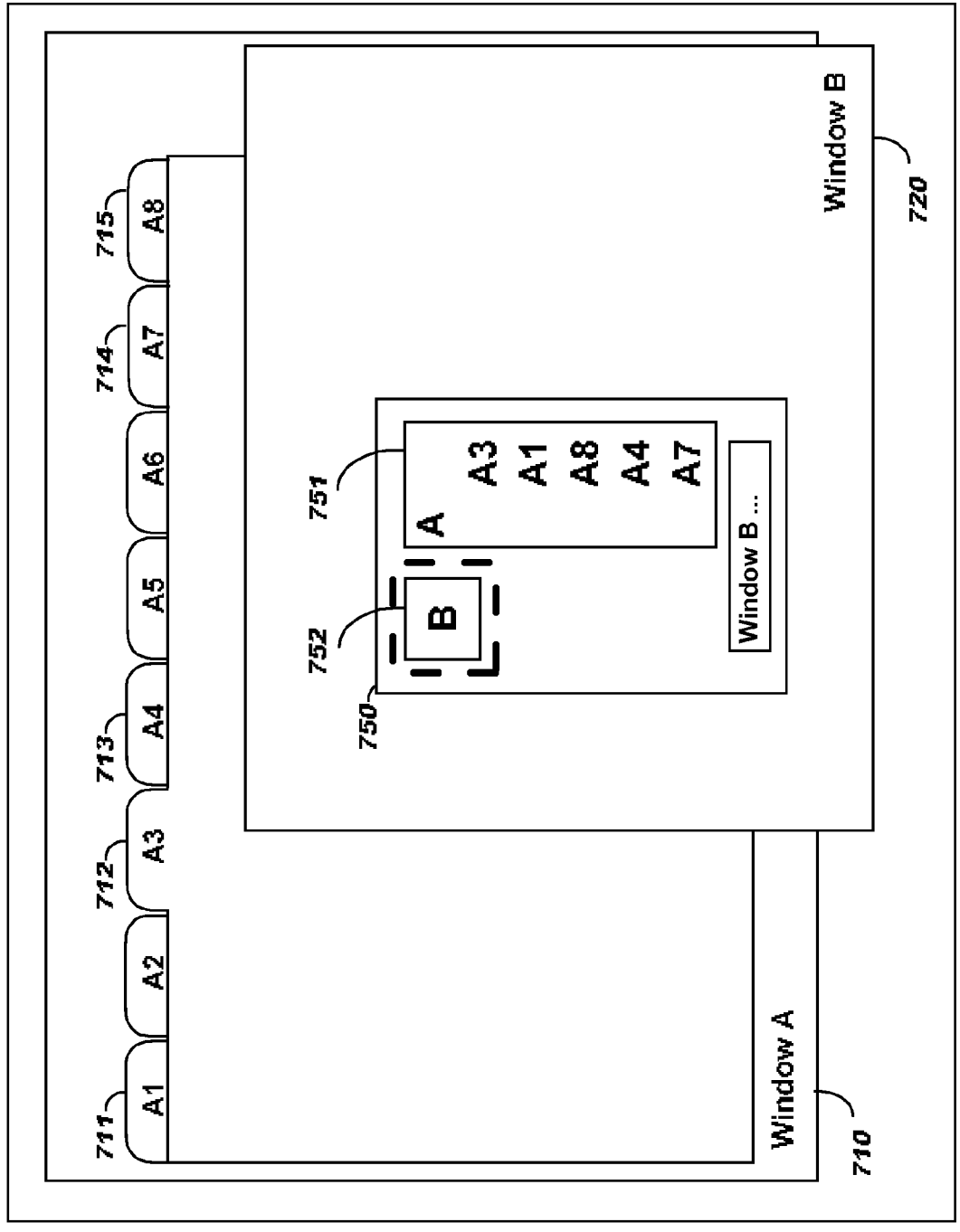
Figure 8:
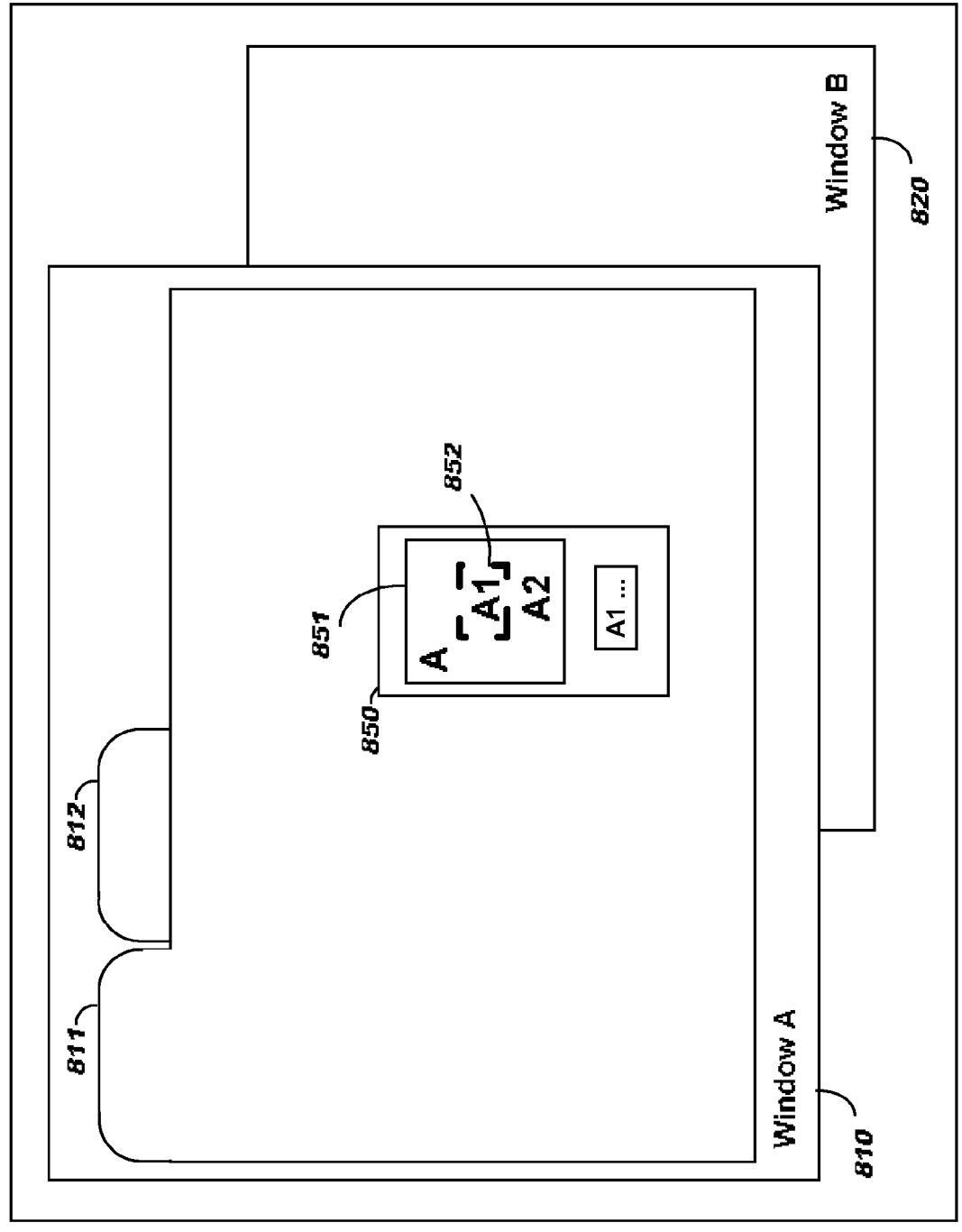
Figure 9:
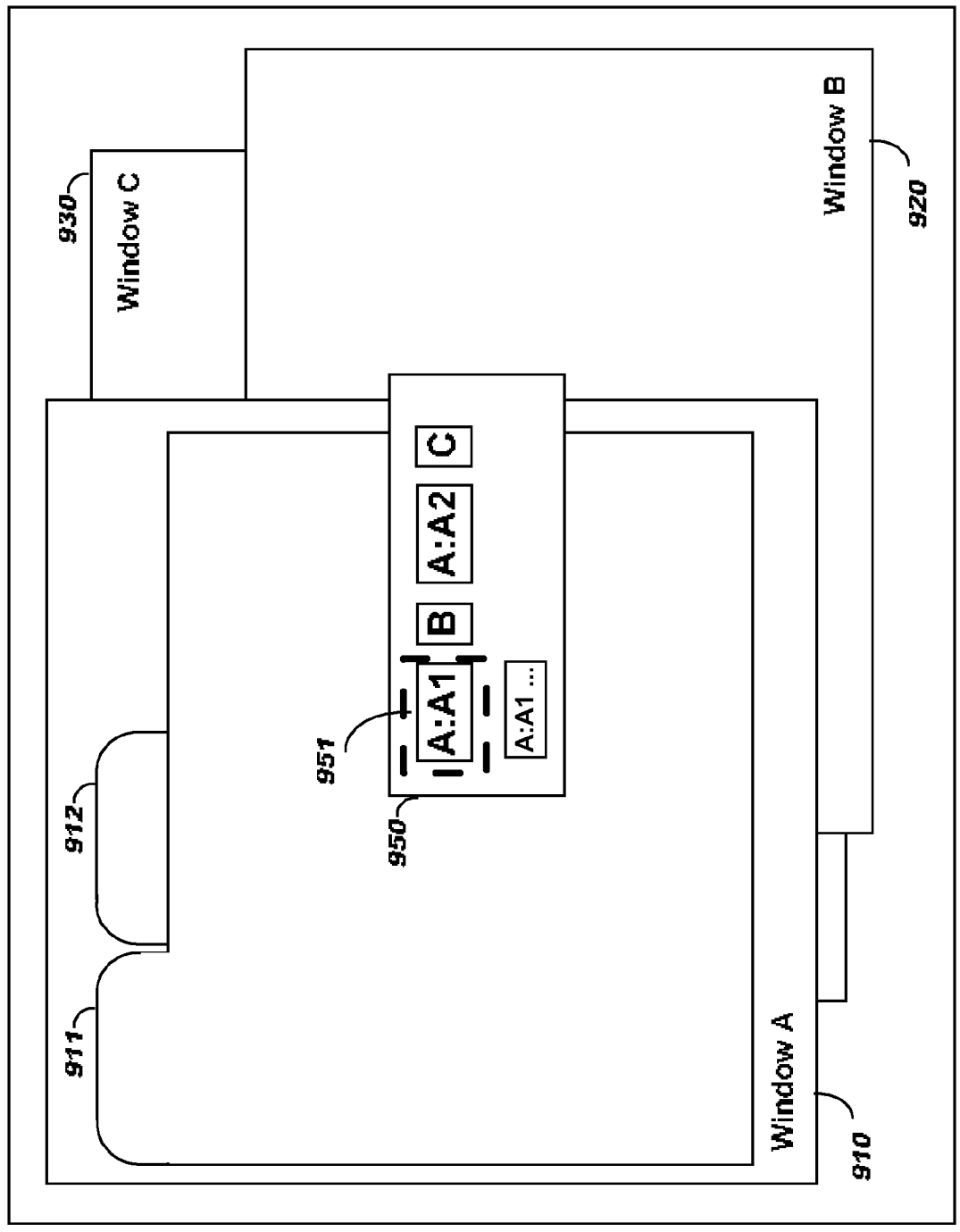

FIG. 4 illustrates a first sample scenario where a 10-minute time limit is imposed on switching sub-windows. As shown therein, 2 parent windows 410, 420 are currently depicted on GUI 400. Parent window 410 comprises 2 sub-windows, as shown by the exposed tabs 411, 412. In this scenario, parent window 420 has the current focus; tabbed window 411 of parent window 410 had focus 5 minutes ago; and tabbed window 412 of parent window 410 had focus 800 minutes ago. Because tabbed window 412 is not within the 10-minute MRU time limit, this tabbed window is not represented in the ALT-TAB switching sequence and is not represented in the MRU task list. Accordingly, pressing ALT-TAB will cycle through the MRU entries on the task list shown in window 450 (where window 410 is referred to as "A", sub-window 411 is referred to as "A1", and window 420 is referred to as "B"). In this scenario, switching among the MRU task list entries begins, in one approach, by switching the graphical highlighting from the iconic representation of parent window 420 (see reference number 452) to the iconic representation of sub-window 411 (see reference number 454), and pressing the TAB key again will switch the graphical highlighting back to the iconic representation of parent window 420. In another approach, when the graphical highlighting switches from parent window 420, it stops next on the iconic representation of parent window 410 (see reference number 453), and then moves to the iconic representation of the child window only if the TAB key is pressed again. Hereinafter, scenarios are described with reference to the first of these approaches, by way of illustration but not of limitation. In either approach, if the user releases the ALT and TAB keys after moving the graphical highlighting, then the window associated with the currently-highlighted iconic representation will receive the focus (and the MRU task list window will preferably disappear). So, for example, if the user presses the TAB key until the graphical highlighting moves to "A1" at 454, then the tabbed sub-window associated with the "A1" iconic representation (which is tabbed sub-window 411, in this example) will receive the focus (and window 450 will preferably disappear).

In a second sample scenario, a time limit is not imposed on MRU switching of sub-windows. This second sample scenario is illustrated in window 500 of FIG. 5. Suppose the same 2 parent windows 410, 420 of FIG. 4 are currently active, wherein parent window 410 again comprises 2 sub-windows corresponding to the exposed tabs 411, 412. As in the first scenario, parent window 420 in this second scenario has the current focus; tabbed window 411 of parent window 410 had focus 5 minutes ago; and tabbed window 412 of parent window 410 had focus 800 minutes ago. Because tabbed window 412 is no longer "aged out" by a time limit, it is now included in the ALT-TAB switching sequence, and an entry (referred to as "A2" for this example) is provided for this sub-window in the MRU task list. See window 550 of FIG. 5. Accordingly, pressing ALT-TAB will switch the graphical highlighting from the iconic representation of parent window 420 (see reference number 552) to the iconic representation of sub-window 411 (i.e., to "A1", which is depicted within the list at reference number 551); pressing the TAB key another time will switch the graphical highlighting from the iconic representation of sub-window 411 to the iconic representation of sub-window 412 (i.e., to "A2"); and pressing the TAB key again will switch the graphical highlighting back to the iconic representation of parent window 420 (i.e., to "B" at 552).

In a third sample scenario, a time limit is again not imposed on MRU switching of sub-windows. This third sample scenario is illustrated in window 600 of FIG. 6. Suppose the same 2 parent windows 410, 420 of FIG. 4 are currently active, wherein parent window 410 again comprises 2 sub-windows corresponding to the exposed tabs 411, 412. As in the first scenario, parent window 420 in this third scenario has the current focus and tabbed window 411 of parent window 410 had focus 5 minutes ago. Now, however, tabbed window 412 of parent window 410 had focus 1 minute ago. Because tabbed window 412 is now more-recently-used than tabbed window 411, tabbed window 412 now appears first within the child window list of parent window 410 within the MRU task list (see reference number 651 in window 650), and within the corresponding ALT-TAB switching sequence. Accordingly, pressing ALT-TAB will switch the graphical highlighting from the iconic representation of parent window 420 (see reference number 652) to the iconic representation of sub-window 412 (i.e., to "A2", which is depicted within the list at reference number 651); pressing the TAB key another time will switch the graphical highlighting from the iconic representation of sub-window 412 to the iconic representation of sub-window 411 (i.e., to "A1"); and pressing the TAB key again will switch the graphical highlighting back to the iconic representation of parent window 420 (i.e., to "B" at 652).

In a fourth sample scenario, a window-count limit is imposed on MRU switching of sub-windows. This fourth sample scenario is illustrated in window 700 of FIG. 7. Suppose, for this scenario, that 2 parent windows 710, 720 are currently active, wherein one of these parent windows (window 710, in this example) comprises 8 sub-windows with tabs exposed and that the other parent window (window 720), which has no sub-windows displayed, has the current focus. For ease of reference, names "A1" through "A8" are depicted in the tabs of the 8 tabbed sub-windows. See, for example, "A1" at reference number 711. Further suppose, for this fourth scenario, that the window-count limit is set to 5. Preferred embodiments of this aspect therefore provide ALT-TAB switching among the parent window without sub-windows (window 720, in the example) and the 5 most-recently-used ones of the tabbed windows of the other parent window. Suppose, for purposes of illustration, that sub-window A3 is the most-recently-used one of the sub-windows (see reference number 712), and that the order of the remaining four most-recently-used ones of these sub-windows is as follows: A1 (see reference number 711); A8 (see reference number 715); A4 (see reference number 713); and A7 (see reference number 714). Thus, pressing ALT-TAB will switch the graphical highlighting from the iconic representation of the window which is currently targeted to have the focus (i.e., window "B" in this example, as shown at 752) to the iconic representation of sub-window A3 (which is shown first in the child list at 751). If the ALT and TAB keys are released while the graphical highlighting is thus positioned, the focus will be given to the tabbed sub-window associated with tab 712 (and window 750 will preferably disappear); alternatively, pressing the TAB key another time will switch the graphical highlighting from the iconic representation of sub-window A3 to the iconic representation of the next-most-recently-used sub-window (i.e., to "A1", in this example); and so forth. Pressing the TAB key when the iconic representation of the fifth of the sub-windows is highlighted will switch the graphical highlighting back to the iconic representation of parent window 720 (i.e., to "B" at 752).

In a fifth sample scenario, a time limit is imposed on MRU switching of sub-windows. This fifth sample scenario is illustrated in window 800 of FIG. 8. Suppose, for this scenario, that 2 parent windows 810, 820 are currently active, and that one of these parent windows (window 810, in this example) comprises 2 sub-windows with tabs exposed. Further suppose, for this fifth scenario, that the time limit is set to 10 minutes; that a first of the tabbed windows (as shown at reference number 811) has the current focus; that the second of the tabbed windows (see reference number 812) had focus 2 minutes ago; and that the parent window without sub-windows displayed (window 820, in this example) had focus 15 minutes ago. Preferred embodiments of this aspect therefore provide ALT-TAB switching among the 2 tabbed sub-windows 811, 812, as parent window 820 has aged out of the MRU task list in this scenario. (See window 850, where the 2 child windows are represented by iconic representations at 851 and the graphical highlighting at 852 is positioned around the iconic representation associated with sub-window 811.) Thus, pressing ALT-TAB will cycle from the first (i.e., the most-recently-used one, which is "A1" in this scenario) of the tabbed sub-windows to the second of the tabbed sub-windows (i.e., to "A2"); and pressing the TAB key again will cycle back to the first of the tabbed sub-windows.

In a sixth sample scenario, a time limit is again imposed on MRU switching of sub-windows. This sixth sample scenario is illustrated in window 900 of FIG. 9. Suppose, for this scenario, that 3 parent windows 910, 920, 930 are currently active, and that one of these parent windows (window 910, in this example) comprises 2 sub-windows with tabs exposed. Further suppose, for this sixth scenario, that the time limit is set to 10 minutes; that a first of the tabbed windows (see reference number 911) has the current focus; that the second of the tabbed windows (see reference number 912) had focus 2 minutes ago; that a first of the other parent windows without sub-windows displayed (see reference number 920) had focus 1 minute ago; and that a second of the other parent windows without sub-windows displayed (see reference number 930) had focus 3 minutes ago. In this sixth scenario, none of the windows or sub-windows has aged out with regard to the 10-minute time limit. Preferred embodiments of this aspect therefore provide ALT-TAB switching, in an MRU task list, among the 2 tabbed sub-windows 911, 912 and the 2 parent windows 920, 930. See window 950, where an iconic representation is provided in the MRU task list for each of these selectable windows and sub-windows. An alternative format has been used, by way of illustration, where the choices are displayed in a row according to their position in the MRU task list, and for this illustration, the parent window identifier "A" has been prepended to the identifiers of its child windows "A1" and "A2". Thus, in the example, the graphical highlighting is shown at 951 with reference to the most-recently-used of the selectable choices (corresponding to tabbed sub-window 911), and pressing ALT-TAB will move the graphical highlighting from 951 to the iconic representation of parent window 920 (i.e., "B", in this example); pressing TAB again will move the graphical highlighting to the iconic representation of the second of the tabbed sub-windows (corresponding to tabbed sub-window 912); pressing the TAB key another time will move the graphical highlighting to the iconic representation of parent window 930 (i.e., "C", in this example); and pressing the TAB key again will cycle back to the first of the tabbed sub-windows (i.e., as shown at reference number 951).

In a further optional aspect, users may be allowed to manually delete a sub-window entry or a parent window entry (and the entries for all of its sub-windows) from the MRU task list. In one approach, the user holds the ALT key and presses the TAB key until the graphical highlighting is positioned at the desired item. The user then presses the "D" key to delete that particular item, the "A" key to delete all children, or "P" to delete all parents. If a parent window is deleted, then all children windows of that parent are also deleted. Responsive to the key pressed by the user, the item will delete from the MRU task list and the graphical highlighting will move to the next item in the MRU order (if one is available). The user may continue to delete items in this manner, or may release the ALT and TAB keys to switch to the currently-highlighted window. In another optional aspect, users may be allowed to delete all sub-windows from the MRU task list. For example, CTRL-D may be used to remove all sub-windows, regardless of what application they belong to.

In yet another optional aspect, users may be given an On/Off toggle mechanism that applies to all sub-windows of a window with focus. For example, suppose the user is running a Lotus Notes application and that this application has the current focus. By pressing a key combination such as CTRL-T (i.e., the CTRL key plus the T key), entries may be added to the MRU task list for all sub-windows of the Lotus Notes application. If entries for selected ones of the sub-windows are already present in the MRU task list, then this toggle operation adds entries for the remaining (i.e., non-present) sub-windows. Preferably, this toggle operation adds all sub-windows, in an MRU order, without regard to whether those sub-windows have recently had focus. That is, sub-windows are preferably not subjected to a time limit or window-count limit when using the toggle operation. Once the toggle key combination has been pressed to add all of an application's sub-windows to the MRU task list, pressing this key combination again removes all of those sub-windows from the MRU task list (again, without regard to how recently a particular sub-window had focus).

As one alternative, the toggle operation may operate not only on the sub-windows of the window that currently has the focus, but on all sub-windows of all presently-active windows.

An optional aspect of the present invention may be provided whereby a user can rapidly cycle among parent windows in the MRU task list. In preferred embodiments of this aspect, if a child window is not currently selected in the MRU task list, pressing the TAB key quickly during ALT-TAB processing will cycle only among the parent windows, without moving to the child windows that may be on the MRU task list. With reference to FIG. 3, for example, this approach causes the graphical highlighting to cycle between "A" and "B", corresponding to parent windows 310 and 320, and the highlighting does not move down to the iconic representations of the child windows, shown in the list at 351 as "A1" through "A4". When using this approach, a hesitation by the user when a parent window is highlighted in the MRU task list preferably signals that the user wants to switch the highlighting to the first child (in the MRU sequence) of that parent. Thus, hesitating when the highlighting is positioned at "A" will cause the highlighting to move to "A1", after which subsequent pressing of the TAB key causes the highlighting to continue downward in the MRU sequence of the child windows. The amount of hesitation that provides the signaling for this approach may be configurable, and is preferably relatively short—for example, on the order of 2 seconds.

It should be noted that when the user releases the ALT and TAB keys, causing a particular window or sub-window to receive the focus, this may cause the order of entries in the MRU task list to change. For example, if a sub-window that has not been recently used receives the focus in this manner, then that sub-window becomes more-recently-used and therefore moves up the task list. If a sub-window is closed, then it is preferably removed from the MRU task list (and its iconic representation is no longer displayed).

Figure 10:
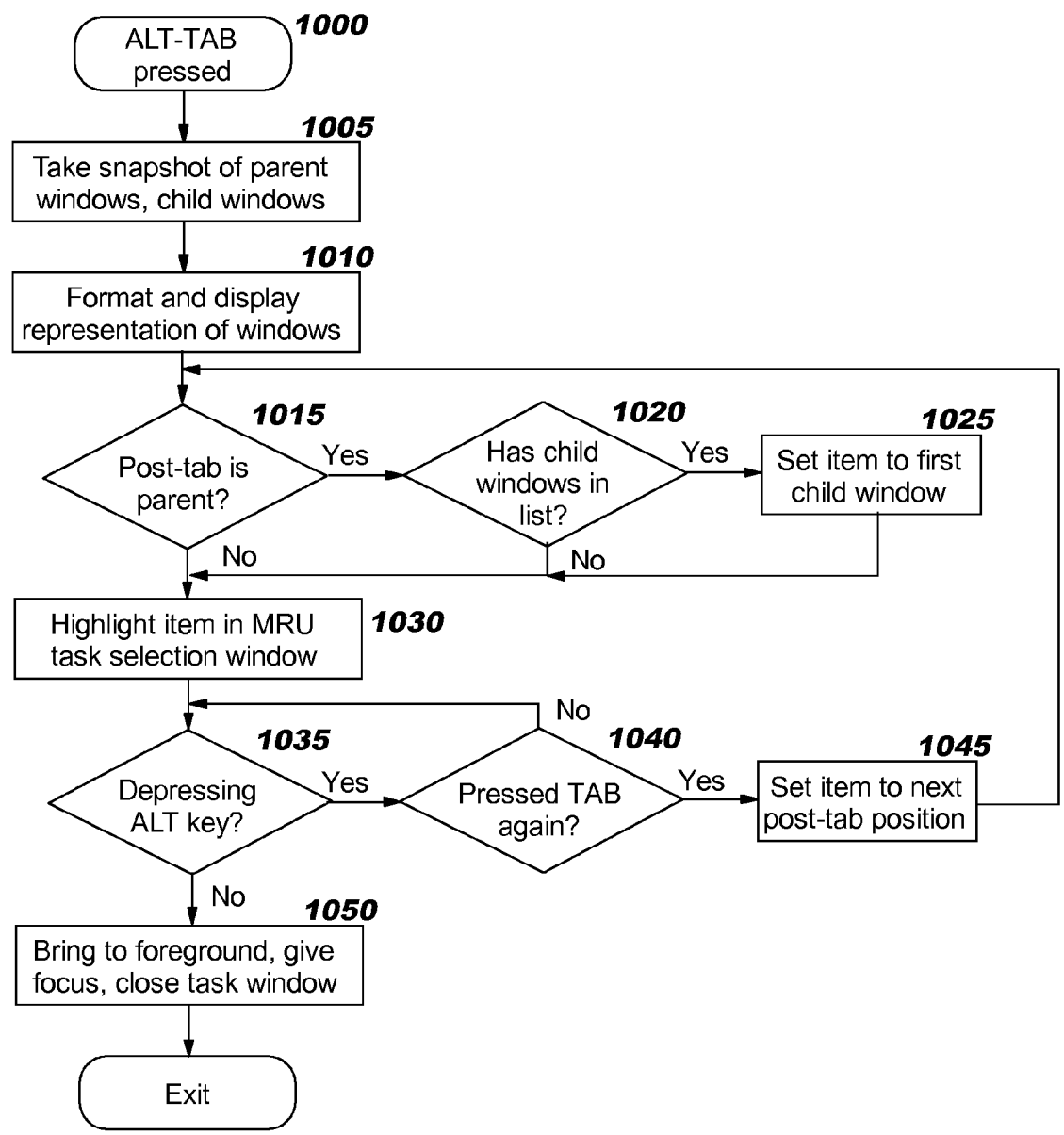
FIGS. 10-12 provide flowcharts depicting logic that may be used when implementing preferred embodiments.
Figure 11:
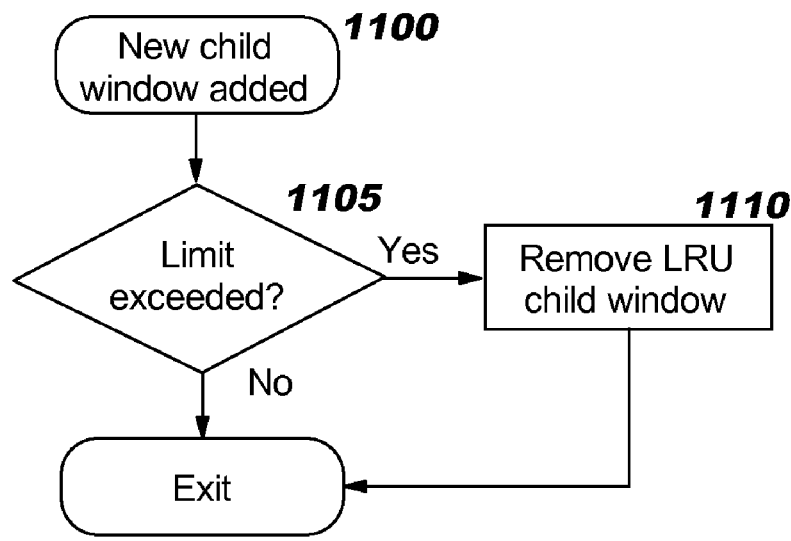
Figure 12:
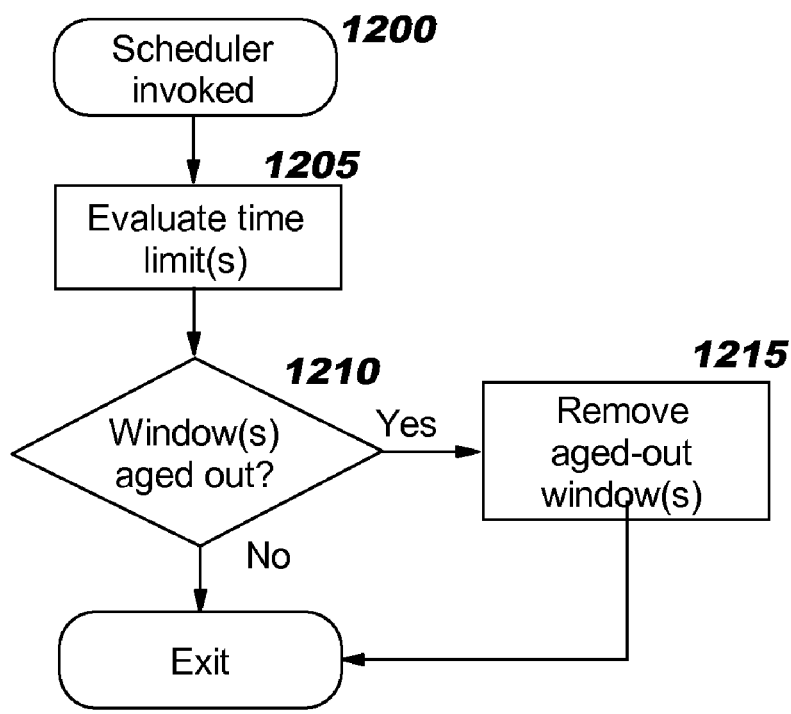

Referring now to FIGS. 10-12, flowcharts are provided that depict logic which may be used when implementing preferred embodiments. FIG. 10 depicts logic for processing the ALT-TAB key combination. FIG. 11 depicts logic for processing a window-count limit on entries in the MRU task list, and FIG. 12 depicts logic for processing a time limit on entries in the MRU task list.

Control enters the processing of FIG. 10 when the user presses the ALT and TAB keys (or, in alternative embodiments, an alternative key combination adapted for invoking the MRU task list switching described herein), as indicated at Block 1000. Block 1005 takes a snapshot of the currently-active parent windows and their child windows. Block 1010 formats a representation of these windows and child windows, and displays this representation on the GUI. In a preferred approach, parent windows are represented horizontally and their child windows are represented vertically under the associated parent (as has been shown, for example, in window 350 of FIG. 3). Furthermore, in this preferred approach, the order of traversing through the MRU task list is to traverse down a particular vertical list of child windows before traversing horizontally to the next parent window or child list thereof.

The term "post-tab" is used in FIG. 10 as a short-hand for the MRU tab-order item that was selected after ALT-TAB was pressed or after TAB was depressed again while depressing ALT—in other words, the currently-highlighted entry in the MRU task list. Block 1015 tests whether post-tab is a parent window. If so, then control reaches Block 1020. Otherwise, when the test at Block 1015 has a negative result, processing continues at Block 1030.

Block 1020 tests whether this parent window has child windows in the MRU task list. If so, then control reaches Block 1025; otherwise, control transfers to Block 1030.

Block 1025 sets the presently-selected item from the MRU task list to the first child window (using the MRU ordering among child windows) of this parent window. Processing then continues at Block 1030.

Block 1030 graphically highlights this item on the MRU task selection window, for example by drawing a box to surround the iconic representation. Block 1035 then tests whether the ALT key is being held down. If so, processing continues at Block 1040; otherwise, control transfers to Block 1050.

Block 1040 tests whether the TAB key has been pressed again. If so, then the currently-selected item is set to the item at the next post-tab position, after which control returns to Block 1015. If the TAB key has not been pressed (i.e., a negative result at Block 1040), then control returns to Block 1035.

Control reaches Block 1050 when the user has released the ALT key. The currently-selected item from the tab-order list is brought to the foreground and given the focus, and the MRU task list window is removed from the GUI. Processing of FIG. 10 then exits.

Preferably, control enters the processing of FIG. 11 when a new child window is added, in the most-recently-used (i.e., highest) position under a particular parent window. See Block 1100. Block 1105 tests whether the window-count limit for this parent window is now exceeded. If so, then control reaches Block 1110, where the least-recently-used ("LRU") one of this parent window's child windows from the MRU task list is removed therefrom. In either case, processing then exits from FIG. 11. (Note that this processing represents an application-specific window-count limit. For an operating system-wide window-count limit, the test at Block 1105 is made with regard to whether this parent's child windows exceed the operating system's window-count limit, and similarly, the processing at Block 1110 removes the least-recently-used one of this parent's sub-windows on the MRU task list.)

The processing of FIG. 12 is preferably invoked in response to an event, such as timer expiration (see Block 1200). A scheduler component evaluates presently-applicable time limits (Block 1205). These time limits may be relative or absolute, as has been discussed above, and an implementation of the present invention may support either or both approach. Block 1210 tests whether this evaluation indicates that any entries from the MRU task list have aged out. If so, those entries are removed (Block 1215). In either case, processing then exits from FIG. 12.

In one alternative approach, FIG. 12 may be invoked responsive to an indication that the user wishes to cause "expiration" of one or more entries on the MRU task list. This user might select to force expiration of all items on the task list, for example, or as another example, might select to expire only the child windows associated with the currently-selected parent window.

As will be appreciated by one of skill in the art, embodiments of the present invention may be provided as (for example) methods, systems, and/or computer program products. The invention may take the form of an entirely hardware embodiment, an entirely software embodiment, or an embodiment containing both hardware and software elements. In a preferred embodiment, the invention is implemented in software, which may include (but is not limited to) firmware, resident software, microcode, etc.

Furthermore, the present invention may take the form of a computer program product accessible from a computer-usable or computer-readable medium providing program code for use by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

Figure 13:
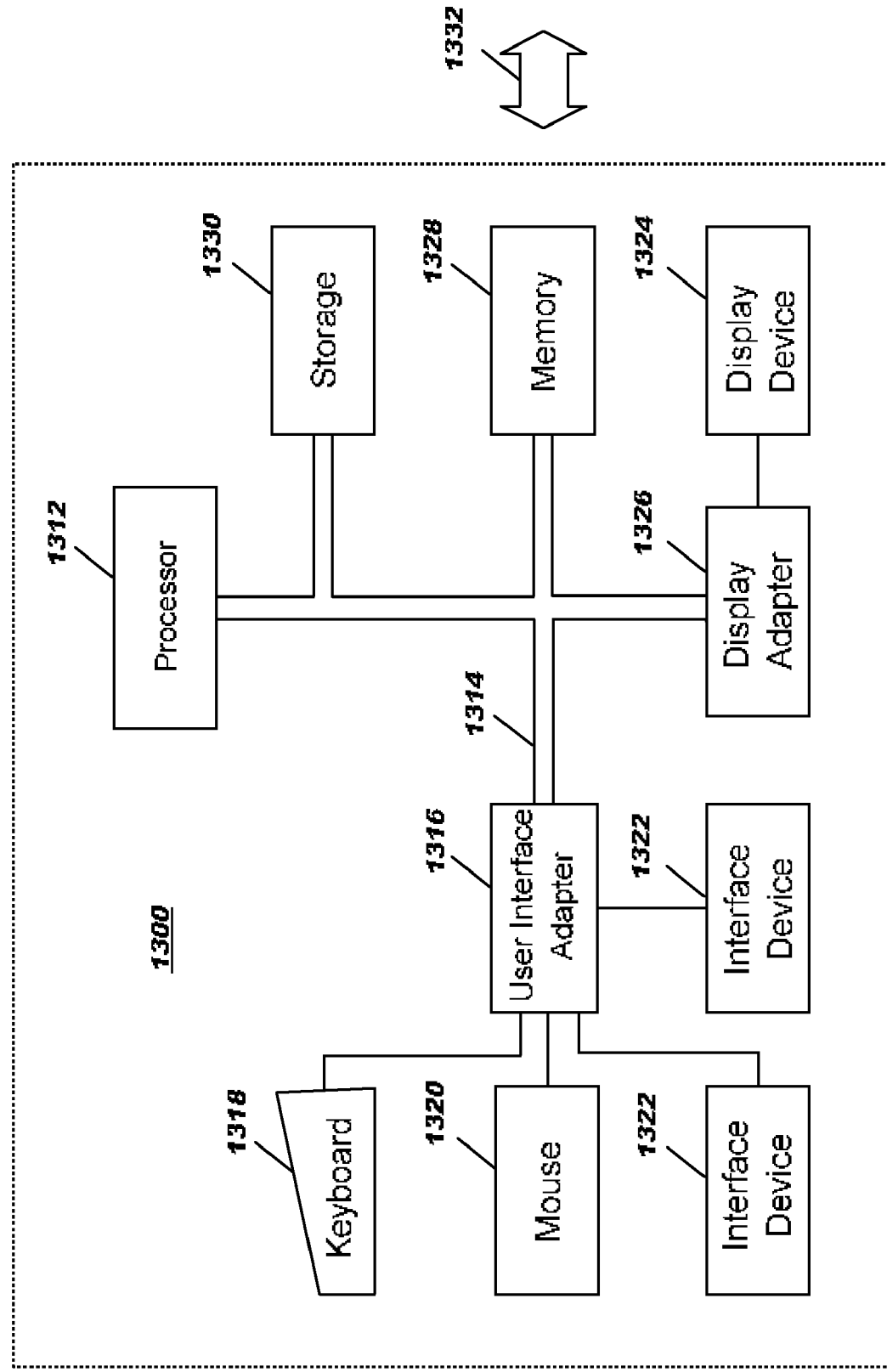
FIG. 13 depicts a data processing system suitable for storing and/or executing program code.

Referring now to FIG. 13, a data processing system 1300 suitable for storing and/or executing program code includes at least one processor 1312 coupled directly or indirectly to memory elements through a system bus 1314. The memory elements can include local memory 1328 employed during actual execution of the program code, bulk storage 1330, and cache memories (not shown) which provide temporary storage of at least some program code in order to reduce the number of times code must be retrieved from bulk storage during execution.

Input/output ("I/O") devices (including but not limited to keyboards 1318, displays 1324, pointing devices 1320, other interface devices 1322, etc.) can be coupled to the system either directly or through intervening I/O controllers or adapters (1316, 1326).

Optionally, network adapters may also be coupled to the system to enable the data processing system to become coupled to other data processing systems or remote printers or storage devices through intervening private or public networks (as shown generally at 1332). Modems, cable modem attachments, wireless adapters, and Ethernet cards are just a few of the currently-available types of network adapters.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

The invention claimed is:
1. A computer-implemented method for task switching among active windows on a graphical user interface ("GUI") of a computing device, comprising:
 determining, for each of a plurality of active windows on the GUI, how recently each of the windows had focus, wherein at least one of the windows is a parent window having at least one child window associated therewith and at least one of the windows has no child window associated therewith;
 creating an ordered task selection list comprising a selectable iconic representation of selected ones of the active windows, further comprising:
  for each of the windows which has no child window associated therewith, placing the selectable iconic representation of the window in the ordered task selection list in order according to the determined recency of the focus of the window which has no child window associated therewith;
  for each of the windows which is a parent window having at least one child window associated therewith, omitting the selectable iconic representation of the parent window from the ordered task selection list; and
  for each of the windows which is a child window, placing the selectable iconic representation of the child window in the ordered task selection list in order according to the determined recency of the focus of the child window;

displaying, responsive to an indication from a user of the computing device, the ordered task selection list in a window; and causing a selection indicator to move through the selectable iconic representations in the displayed ordered task selection list, responsive to an action of the user, in the order in which the selectable iconic representations were placed in the ordered task selection list.

2. The method according to claim 1, wherein the indication from the user comprises the user pressing a combination of keys on a keyboard of the computing device.

3. The method according to claim 1, wherein the action of the user comprises the user pressing a first key on a keyboard of the computing device while depressing a second key on the keyboard.

4. The method according to claim 3, wherein the first key is a tab key and the second key is an ALT key.

5. The method according to claim 1, wherein the order is from most-recently-used to least-recently-used, with regard to the determined recency of the focus.

6. The method according to claim 1, wherein the selectable iconic representations are also omitted from the ordered task selection list for any of the plurality of active windows that are determined not to have had the focus within a recent time interval.

7. The method according to claim 6, wherein the recent time interval is associated with an application displaying one of the active windows which is a parent window and the selectable iconic representations which are also omitted are for active child windows which are associated with the one parent window and which have not had the focus within the recent time interval.

8. The method according to claim 6, wherein the recent time interval applies to all of the active windows.

9. The method according to claim 1, wherein the selectable iconic representations are also omitted from the ordered task selection list for any of the plurality of active windows that are determined not to have had the focus after a particular time of day.

10. The method according to claim 1, wherein the selectable iconic representations placed in the ordered task selection list are limited to a subset of the plurality of active windows, the subset comprising a particular number of the active windows, wherein members of the subset are those of the active windows that are determined to have had the focus most recently and that are not parent windows having at least one child window associated therewith.

11. The method according to claim 1, wherein the selectable iconic representations placed in the ordered task selection list are limited, for a particular one of the active windows which is a parent window having at least one active child window associated therewith, to a subset of the active child windows of the particular one, the subset comprising a particular number of the active child windows of the particular one, wherein members of the subset are those of the active child windows of the particular one that are determined to have had the focus most recently.

12. The method according to claim 1, further comprising:
upon a signal from the user, after the action of the user causes the selection indicator to move to a selected one of the selectable iconic representations,
bringing a selected one of the windows to foreground of the GUI and giving the focus to the selected one in the foreground, the selected one of the windows comprising that one of the windows which is associated with the selected one of the selectable iconic representations; and
removing the window in which the ordered task selection list is displayed from the GUI.

13. A system for task switching among active windows on a graphical user interface ("GUI") of a computing device, comprising:
a computer comprising a processor; and
instructions which execute, using the processor, to perform functions comprising:
determining, for each of a plurality of active windows on the GUI, how recently each of the windows had focus, wherein at least one of the windows is a parent window having at least one child window associated therewith and at least one of the windows has no child window associated therewith;
creating an ordered task selection list comprising a selectable iconic representation of selected ones of the active windows, further comprising:
for each of the windows which has no child window associated therewith, placing the selectable iconic representation of the window in the ordered task selection list in order according to the determined recency of the focus of the window which has no child window associated therewith;
for each of the windows which is a parent window having at least one child window associated therewith, omitting the selectable iconic representation of the parent window from the ordered task selection list; and
for each of the windows which is a child window, placing the selectable iconic representation of the child window in the ordered task selection list in order according to the determined recency of the focus of the child window;
displaying, responsive to an indication from a user of the computing device, the ordered task selection list in a window; and
causing a selection indicator to move through the selectable iconic representations in the displayed ordered task selection list, responsive to an action of the user, in the order in which the selectable iconic representations were placed in the ordered task selection list.

14. The system according to claim 13, wherein the action of the user comprises the user pressing a tab key on a keyboard of the computing device while depressing an ALT key on the keyboard.

15. The system according to claim 13, wherein the order is from most-recently-used to least-recently-used, with regard to the determined recency of the focus.

16. The system according to claim 13, wherein the selectable iconic representations placed in the ordered task selection list are limited, for a particular one of the active windows which is a parent window having at least one active child window associated therewith, to a subset of the active child windows of the particular one, the subset comprising a particular number of the active child windows of the particular one, wherein members of the subset are those of the active child windows of the particular one that are determined to have had the focus most recently.

17. A computer program product comprising at least one computer-usable storage media, the storage media embodying computer-usable program code for task switching among active windows on a graphical user interface ("GUI") of a computing device, wherein the computer-usable program code, when executing on the computing device, causes the computing device to:

determine, for each of a plurality of active windows on the GUI, how recently each of the windows had focus, wherein at least one of the windows is a parent window having at least one child window associated therewith and at least one of the windows has no child window associated therewith;

create an ordered task selection list comprising a selectable iconic representation of selected ones of the active windows, further comprising:

for each of the windows which has no child window associated therewith, place the selectable iconic representation of the window in the ordered task selection list in order according to the determined recency of the focus of the window which has no child window associated therewith;

for each of the windows which is a parent window having at least one child window associated therewith, omit the selectable iconic representation of the parent window from the ordered task selection list; and for each of the windows which is a child window, place the selectable iconic representation of the child window in the ordered task selection list in order according to the determined recency of the focus of the child window;

display, responsive to an indication from a user of the computing device, the ordered task selection list in a window;

cause a selection indicator to move through the selectable iconic representations in the displayed ordered task selection list, responsive to an action of the user, in the order in which the selectable iconic representations were placed in the ordered task selection list.

18. The computer program product according to claim 17, wherein the order is from most-recently-used to least-recently-used, with regard to the determined recency of the focus.

19. The computer program product according to claim 17, wherein the selectable iconic representations placed in the ordered task selection list are limited, for a particular one of the active windows which is a parent window having at least one active child window associated therewith, to a subset of the active child windows of the particular one, the subset comprising a particular number of the active child windows of the particular one, wherein members of the subset are those of the active child windows of the particular one that are determined to have had the focus most recently.

20. The computer program product according to claim 17, further comprising:

upon a signal from the user, after the action of the user causes the selection indicator to move to a selected one of the selectable iconic representations, bringing a selected one of the windows to foreground of the GUI and giving the focus to the selected one in the foreground, the selected one of the windows comprising that one of the windows which is associated with the selected one of the selectable iconic representations; and removing the window in which the ordered task selection list is displayed from the GUI.

\* \* \* \* \*